United States Patent [19]

Ishii et al.

[11] Patent Number: 5,978,522

[45] Date of Patent: Nov. 2, 1999

[54] IMAGE PROCESSING APPARATUS ENABLING EASY SETTING OF SPATIAL FREQUENCY CHARACTERISTIC OF IMAGE DATA

[75] Inventors: Akira Ishii; Tetsushi Anabuki; Yuji Kobayashi; Yoshitsugu Hirose, all of Ebina, Japan

[73] Assignee: Fuji Xerox Co., Ltd., Tokyo, Japan

[21] Appl. No.: 08/733,193

[22] Filed: Oct. 17, 1996

[30] Foreign Application Priority Data

Oct. 20, 1995 [JP] Japan .................................. 7-273123
Sep. 26, 1996 [JP] Japan .................................. 8-254773

[51] Int. Cl.⁶ .............................. H04N 1/393; G06T 5/00
[52] U.S. Cl. .......................... 382/299; 382/263; 358/452
[58] Field of Search ...................................... 358/450–453, 358/462–464, 210, 458; 382/298–299, 263–265; H04N 1/393; G06T 5/00

[56] References Cited

U.S. PATENT DOCUMENTS

| | | | |
|---|---|---|---|
| 5,301,037 | 4/1994 | Kang et al. | 358/451 |
| 5,436,734 | 7/1995 | Yamauchi et al. | 358/452 |
| 5,517,331 | 5/1996 | Murai et al. | 358/451 |
| 5,566,284 | 10/1996 | Wakayama . | |
| 5,696,850 | 12/1997 | Pasulski et al. | 382/263 |

FOREIGN PATENT DOCUMENTS

A-3-88571  4/1991  Japan .

Primary Examiner—Kim Yen Vu
Attorney, Agent, or Firm—Oliff & Berridge, PLC

[57] ABSTRACT

An image processing apparatus applied to an image processing system wherein a plurality of image input units and a plurality of image output units are used. A spatial frequency characteristic conversion section receives a spatial frequency characteristic in a preparation process of image data from an image input unit or its driver and a spatial frequency characteristic of a selected image output unit from an output device information storage section. An ideal transfer characteristic of the whole system is previously stored in the spatial frequency characteristic conversion section and a transfer function of the spatial frequency characteristic conversion section itself is set so as to realize the ideal transfer characteristic.

22 Claims, 14 Drawing Sheets

FIG. 13

| FUNCTION NO. | FUNCTION | IMAGE INPUT CHANNEL | IMAGE OUTPUT SEC. |
|---|---|---|---|
| 1 | COPIER | SCANNER SEC. | PRINTER SEC. |
| 2 | FAX TRANSMISSION OF DOCUMENT | SCANNER SEC. | TELEPHONE LINES |
| 3 | RENDERING INTO ELECTRONIC DOCUMENT | SCANNER SEC. | NETWORK |
| 4 | FAX RECEPTION/ PRINTOUT | MODEM | PRINTER SEC. |
| 5 | FAX RECEPTION/ RENDERING INTO ELECTRONIC DOCUMENT | MODEM | NETWORK |
| 6 | PRINTOUT OF ELECTRONIC DOCUMENT | NETWORK I/F | PRINTER SEC. |
| 7 | FAX TRANSMISSION OF ELECTRONIC DOCUMENT | NETWORK I/F | TELEPHONE LINES |

FIG. 14
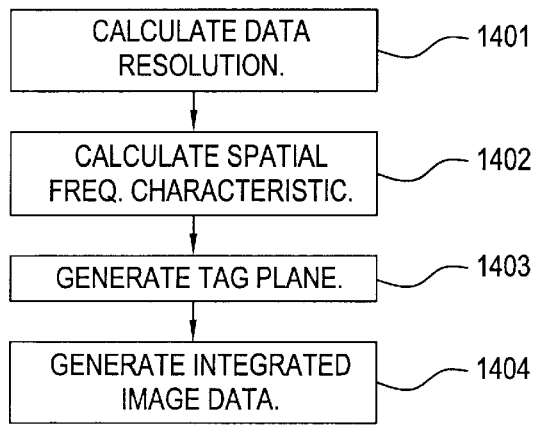
FIG. 15
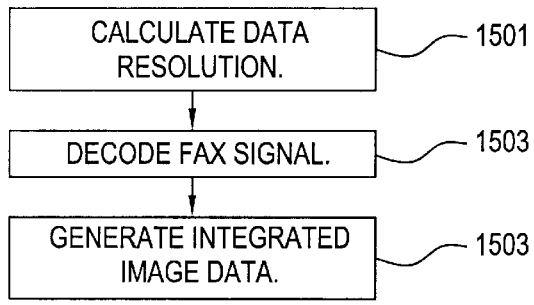
FIG. 16
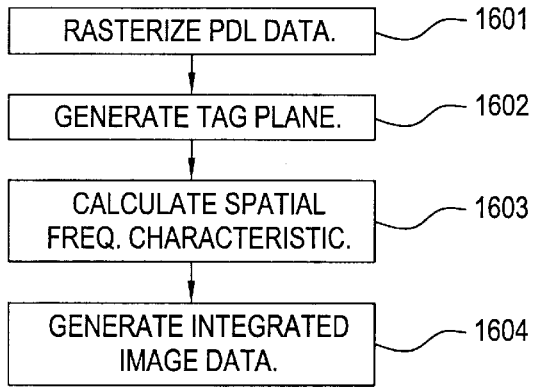
FIG. 17
| IMAGE OUTPUT SEC. | | RESOLUTION | SPATIAL FREQ. CHARACTERISTIC |
|---|---|---|---|
| PRINTER | TAG "0" | 24dpm | F6 |
| | TAG NOT "0" | 24dpm | F7 |
| MODEM | | Null | Null |
| NETWORK I/F | | Null | Null |

IMAGE PROCESSING APPARATUS ENABLING EASY SETTING OF SPATIAL FREQUENCY CHARACTERISTIC OF IMAGE DATA

BACKGROUND OF THE INVENTION

1. Field of the Invention

This invention relates to an image processing apparatus appropriate for use in an image processing system which integrates such components as image input units and image output units.

2. Description of the Related Art

There are conceivable various forms of image processing systems comprising image input units, an image processing apparatus, and image output units. A general digital copier is considered the simplest form of image processing system having one unit for each category. By the way, image input and output units has a spatial frequency characteristic; if this spatial frequency characteristic is ignored, it is difficult to provide a high-quality output image.

It is not necessarily proper to flatten the spatial frequency characteristic of the entire digital copier. For example, to output characters, line drawings, etc., it is preferable that edge enhancement be effected. Therefore the gain needs to be raised in a high spatial frequency range. On the other hand, for a halftone dot image like a print original, the gain needs to be lowered to prevent moire in a high spatial frequency range.

Such a gain adjustment is made by the image processing apparatus in the digital copier to provide a desirable spatial frequency characteristic as the whole copier. The desirable spatial frequency characteristic varies depending on the type of input image. For example, an image processing apparatus is also known which assumes the types of input images to be characters, photographs, characters plus photographs, and maps and changes a correction characteristic in response to the detected (or user-specified) image type.

A general image processing system is provided with a plurality of image input units and image output units, one of which is selected as required. In such a case, the spatial frequency characteristic also changes with the selected unit. Thus, an image processing apparatus which selects a correction characteristic responsive to the selected input/output channel is also proposed in Japanese Unexamined Patent Publication No. Hei. 3-88571.

By the way, in the above-mentioned configurations, the person who determines the correction characteristic of an image processing apparatus previously knows the spatial frequency characteristics of image input and output units and sets the optimum correction characteristic for the image processing apparatus in response to the selected image input and units and the input image type. Since it is intricate for the general user to perform such work, generally the engineers of the manufacturer set the correction characteristics.

However, in recent years, networking of image processing machines has been increasing and it has become difficult for the manufacturer to understand what image input and units the user connects to a network. Further, as image input and output units increase, the number of necessary correction characteristic items becomes enormous. For example, assuming that ten models of image input units and ten models of image output units are provided and that the number of image types is four, the number of necessary correction characteristic items becomes 400.

In fact, more correction characteristic items become necessary. For example, most scanners often used as image input units have a plurality of operation modes of "high image quality mode," "high speed mode," etc., and the spatial frequency characteristic also varies depending on the operation mode. With CD-ROM drives, etc., the spatial frequency characteristics of image data stored on CDs, etc., vary although the CD-ROM drive, etc., contains only one operation mode.

That is, the spatial frequency characteristics of image data vary from image data to image data according to the scanners used in the producers of the image data and the production process. In view of the realities, determination of the correction characteristic in response to each input/output channel is technically possible, but is poor in realizability. After all, in network systems, a sufficient correction characteristic adjustment cannot be made and it is difficult to make the most of performance of image input and output units.

SUMMARY OF THE INVENTION

It is therefore an object of the invention to provide an image processing apparatus which can easily set an appropriate correction characteristic in response to the preparation process and the output mode of each image data.

To attain the above object, according to the invention, there is provided an image processing apparatus comprising:

first recognizing means for recognizing a spatial frequency characteristic in a process of preparing image data;

second recognizing means for recognizing a spatial frequency reproduction characteristic in an output mode for forming an image based on the image data; and means for converting a spatial frequency characteristic of the image data based on recognition results of the first and second recognizing means.

In the above configuration, the first recognizing means may further recognize resolution information in the process of preparing the image data.

The spatial frequency reproduction characteristic in the output mode may include resolution information in the output mode.

The image processing apparatus may further comprise third recognizing means for recognizing a spatial frequency reproduction characteristic for image adjustment, wherein the conversion means converts the spatial frequency characteristic of the image data further based on the recognition result of the third recognizing means.

The first recognizing means may recognize the spatial frequency characteristic based on information added to the image data.

Where the image data is constituted of objects, the first recognizing means recognizes the spatial frequency characteristic on an object-by-object basis.

The image processing apparatus may further comprise means for storing device information relating the process of preparing image data, wherein the first recognizing means recognizes the spatial frequency characteristic based on the device information stored in the storing means.

The image processing apparatus may further comprise means for storing output device information of the output mode, wherein the second recognizing means recognizes the spatial frequency reproduction characteristic based on the output device information stored in the storing means.

The image processing apparatus may further comprise means for selecting one of two output modes for forming an image; first correcting means for correcting image data that is output from the selected one of the two output modes; and second correcting means for correcting image data that is output from the other output mode based on a correction result of the first correcting means.

The term "output mode" as used above means both of an output unit or output medium (for example, a printer or a display) and an operation mode in the output unit or output medium (for example, a 200-spi or 400-spi mode in a printer).

BRIEF DESCRIPTION OF THE DRAWINGS

FIG. 13 is a table listing functions of the composite machine of FIG. 11;

FIGS. 14–16 are flowcharts showing operations in the fourth embodiment of the invention; and FIG. 17 is a table showing a data format of an output device information storage section of a HDD.

DESCRIPTION OF THE PREFERRED EMBODIMENTS

Figure 1:
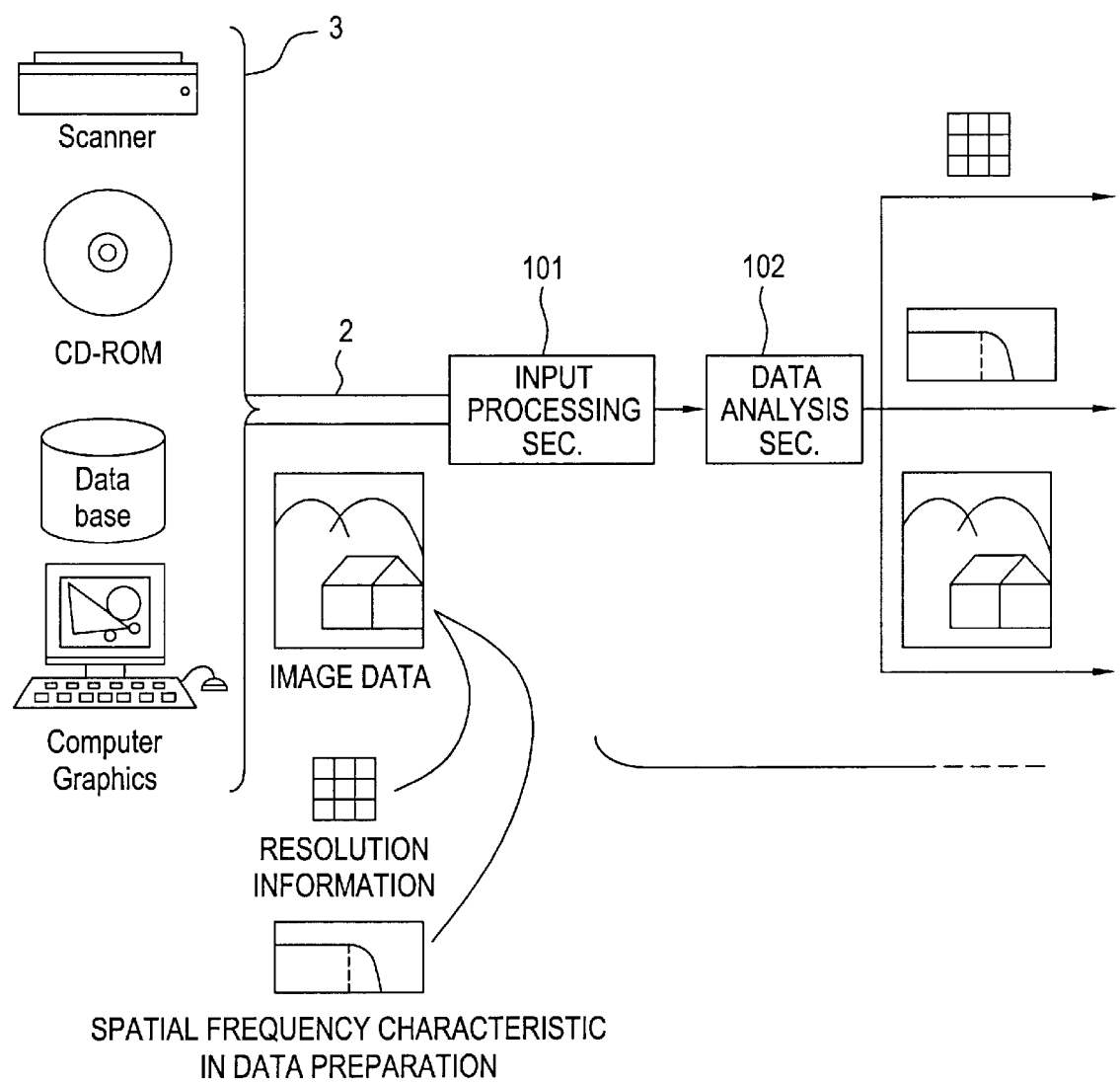
FIGS. 1 and 2 are block diagrams showing the configuration of an image processing system according to a first embodiment of the invention.

Referring now to the accompanying drawings, preferred embodiments of the invention will be described below.
First Embodiment
Configuration:
An image processing system of a first embodiment of the invention will be discussed with reference to FIGS. 1 and 2.

In the figures, numeral 1 is an image processing apparatus which is made up of a CPU, a memory, a hard disk, a keyboard, a display, etc. The image processing apparatus 1 receives image data, etc., from image input units 3, such as a scanner, a CR-ROM drive, and a database via a network 2 consisting of LANs, public switched telephone lines, etc. It performs processing (described later) for input image data and supplies the resultant image data to an image output unit (or output mode) selected from among image output units 4, whereby the selected image output unit outputs an image corresponding to the image data.

Next, the contents of processing sections provided by hardware or software will be discussed. Numeral 101 is an input processing section for spooling input image data, etc., on hard disk as required and supplies the spooled image data, etc., to a data analysis section 102. The format of image data, etc., in the embodiment will be discussed.

The image data, etc., in the embodiment consists of a resolution description division, a spatial frequency characteristic description division, image data (for example, gradational map data), and other data pieces. Data resulting from integrating them will be hereinafter referred to as integrated image data. The resolution of the device for preparing input image data is described in the resolution description division. Spatial frequency characteristics in the process of preparing the input image data are described in the spatial frequency characteristic description division.

The spatial frequency characteristic description division consists of a spatial frequency characteristic at a Nyquist frequency specified by a read resolution and spatial frequency characteristics at ½, ⅓, ¼, and ⅕ of the Nyquist frequency. For example, if the input image data has a resolution of 24 dpm, the spatial frequency characteristics at 12 lpm, 6 lpm, 4 lpm, 3 lpm, and 2.4 lpm are described.

For example, if a scanner is selected as an image input unit, its corresponding scanner driver sets the contents of the spatial frequency characteristic description division in response to the operation mode, such as high image quality mode or high speed mode. Spatial frequency characteristics are previously recorded on a CD set in a CD-ROM drive by the CD producer and the record contents are described in the spatial frequency characteristic description division. The image contents are described in the gradation map data description division as gradation map data.

The embodiment has one feature in use of the "spatial frequency characteristics in the process of preparing the input image data." That is, although the input/output channel (for example, a scanner as an image input unit) itself is the same, if the operation mode of the scanner differs, the "spatial frequency characteristics in the process of preparing the input image data" differ.

Upon reception of integrated image data from the input processing section 101, the data analysis section 102 analyzes the integrated image data and divides it into the resolution description division, the spatial frequency characteristic description division, and the gradation map data description division. Next, numeral 107 is an output device information storage section for storing the spatial frequency characteristics and resolution information of image output units (and output modes). Numeral 106 is an output device selection section for outputting an image output selection signal SELL specifying any one of the image output units based on a user command (or an instruction of another computer making an image data print request).

Then, the output device information storage section 107 selects the spatial frequency characteristics and resolution information corresponding to the image output selection signal SELL and outputs the contents of the spatial frequency characteristics and resolution information. Numeral 103 is a resolution conversion section. Upon reception of resolution information of input image data and the selected image output unit and an output image scaling factor, the resolution conversion section 103 calculates a data scaling factor based on Equation (1):

(Data scaling factor)={(output image scaling factor)×(image output unit resolution)}/(input image data resolution)  (1)

where the output image scaling factor is an apparent scaling factor specified by the user.

As an example, assuming that the input image data resolution is 12 dpm (dots/mm), that the image output unit resolution is 24 dpm, and that the output image scaling factor is 100%, the data scaling factor becomes 200%. That is, the input image data is doubled (the area is quadrupled) in terms of pixels by the resolution conversion section 103.

The specific processing contents executed by the resolution conversion section 103 to implement processing of Equation (1) will be discussed. First, assume that Ii and Io are an input image file and an output image file respectively. Also, assuming that the data size of the input image file Ii is (Xi, Yi) and that the data scaling factor is m, the data size of the output image file Io, (Xo, Yo), is found from Equation (2) (in the embodiment, the fractional portions of the results are discarded):

$$Xo = mxi$$
$$Yo = myi \qquad (2)$$

Assuming that the input image file Ii and the output image file Io are expanded on the same rectangle, pixel pitches do not match because both the files differ in data size. Therefore, generally each pixel in the output image file Io is surrounded by four pixels in the input image file Ii. The densities of the four pixels are represented by Ii(i/m, j/m), Ii(i/m+1, j/m), Ii(i/m, j/m+1), and Ii(i/m+1, j/m+1).

Figure 8:
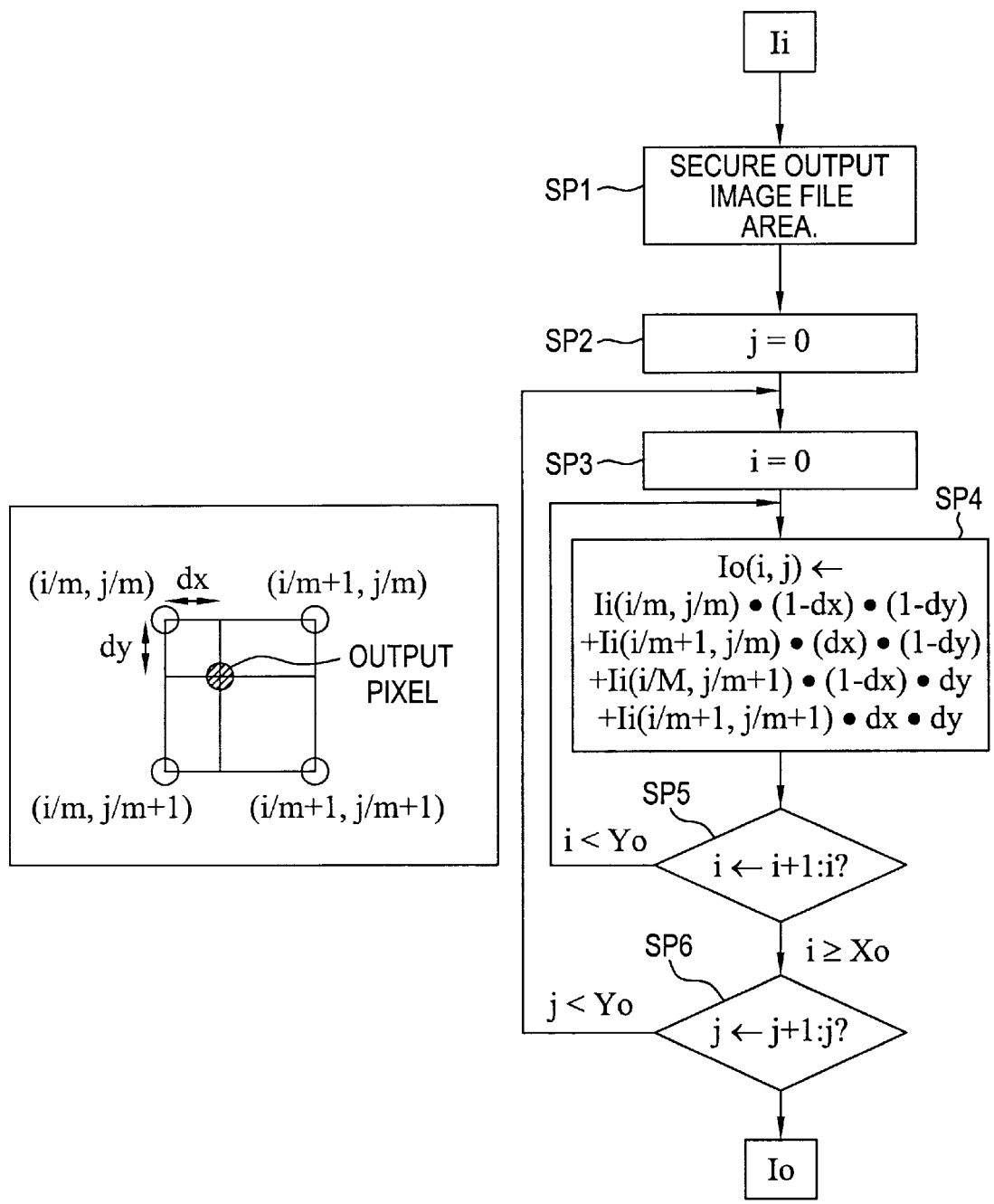
FIG. 8 is a flowchart showing a process performed by a resolution conversion section.

Here, i/m and j/m represent the results of dividing variables i and j by data scaling factor m (the fractional portions of the results are discarded). Interpolation is applied to the densities of the four pixels, whereby the pixel density in the image output file Io is found. The processing contents will be discussed with reference to FIG. 8. In the figure, when control goes to step SP1, an area for storing the output image file Io is reserved.

Next, when steps SP2 and SP3 are executed, 0 is substituted into variables i and j. When control goes to step SP4, pixel density Io(i, j) in the output image file (Io(0, 0) at this time point) is found by the above-mentioned interpolation. Although various interpolation methods are known, the embodiment adopts a load average calculation method with four surrounding pixels.

A load parameter is an area ratio of squares produced by the diagonal lines of the four surrounding pixels and the output pixel. It may be calculated from the distance between the four surrounding pixels and the output pixel. Next, when control goes to step SP5, the variable i is incremented by one and further whether or not the variable i becomes equal to or greater than the data size in the horizontal scanning direction, Xo, is determined.

If the determination at step SP5 is NO, control returns to step SP4 and similar operation is repeated, whereby pixel densities Io(0, 0) to Io(Xo-1, 0) are calculated in sequence. Next, when control goes to step SP5, the variable i becomes equal to the data size in the horizontal scanning direction, Xo. Then, the determination at step SP5 becomes YES and control goes to step SP6.

At step SP6, the variable j is incremented by one and control goes to step SP3, whereby the variable i is reset to 0 and pixel densities Io(0, 1) to Io(Xo-1, 1) are calculated in sequence. When similar processing is repeated and all of pixel densities Io(0, 0) to Io(Xo-1, Yo-1) are provided, the results are output to the output image file Io.

Referring again to FIGS. 1 and 2, numeral 104 is a spatial frequency characteristic conversion section for previously storing desirable spatial frequency characteristics (target transfer characteristics) of the whole image processing system. Upon reception of a data scaling factor from the resolution conversion section 103 and the spatial frequency characteristic of an image input unit from the data analysis section 102, the spatial frequency characteristic conversion section 104 scales the spatial frequency characteristic in response to the received data scaling factor and once stores the result (scaled spatial frequency characteristic).

The spatial frequency characteristic of input image data can be represented by a graph with the spatial frequencies and gains chosen as the horizontal and vertical axes respectively. For example, if the data scaling factor is 200%, the scaled spatial frequency characteristic becomes a characteristic such that the graph of the original spatial characteristic is reduced to a half toward the origin in the horizontal axis direction (spatial frequency=0). An example of the scaled spatial frequency characteristic of input image data is shown as function F1 in FIG. 3.

The spatial frequency characteristic of an image output unit is represented by function F2 in the figure. The result of multiplying function F1 by function F2, in other words, the spatial frequency characteristic of the input image data plus the image output unit is represented by function F3 in the figure. That is, function F3 is the spatial frequency characteristic of the whole image processing system on the assumption that no corrections are made in the spatial frequency characteristic conversion section 104.

Next, an example of the target transfer characteristic preset in the spatial frequency characteristic conversion section 104 is shown as function F4 in the figure. The result of dividing F4 by F3 is shown as function F5. That is, the function F5 corresponds to the correction characteristic to be given to image data by the spatial frequency characteristic conversion section 104 in order to set the spatial frequency characteristic of the whole image processing system to the function F4. That is, the transfer function of the spatial frequency characteristic conversion section 104 is set so as to equal the correction characteristic.

Figure 9:
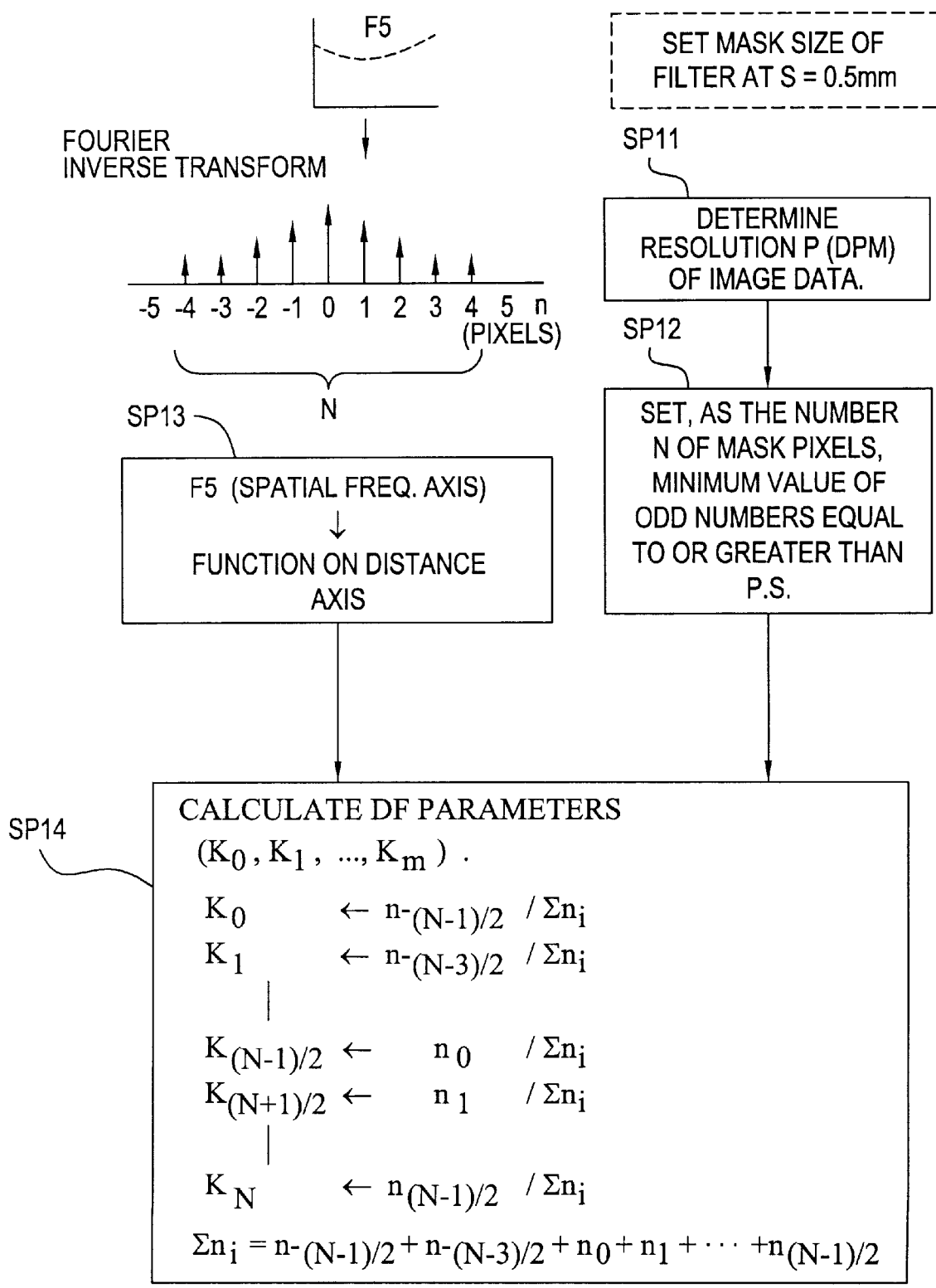
FIG. 9 shows a DF parameter calculating operation of a spatial frequency characteristic conversion section.

By the way, the spatial frequency characteristic conversion section 104 assumes the range of predetermined size S containing an object pixel (mask), previously relates a coefficient, called a DF parameter, to the pixels in the mask, and performs an arithmetic operation of sum of products with the DF parameter on the density of the pixels, thereby determining the object pixel density after conversion. On the other hand, the function F5 is represented as a curve on a two-dimensional plane and thus needs to be previously converted into the DF parameter. This process will be outlined with reference to FIG. 9.

First, at step SP11, resolution P of image data (output image to which resolution conversion is applied) is determined. Next, at step SP12, the number of pixels in the mask, N, is found based on the mask size S and the resolution P. That is, the minimum value of odd numbers equal to or greater than the product of the mask size S and the resolution P is assigned to the number of pixels in the mask, N. From the viewpoint of the image quality, the mask size S is preset to 0.5 mm, for example. Since the mask size S is involved in the processing time, preferably a plurality of mask sizes are provided according the types of image output units and the output purposes so that the user can select one of the mask sizes.

On the other hand, step SP13 is executed concurrently with steps SP11 and SP12. At step SP13, Fourier inverse transform is applied to function F5 to generate a pixel-unit function on the distance axis. Upon completion of steps SP11–SP13, step SP14 is executed. Here, N function values (amplitude values) centering around "0 point" of pixel are extracted from the functions generated at step SP13.

Normalization is executed so that the functions total up to 1 in order to set the gain to 1 if the spatial frequency is 0. The normalization result is set in the DF parameter. We have discussed DF parameter calculation processing when a one-dimensional mask is used; however, if a two-dimensional mask is used, likewise the DF parameter can be found.

After the DF parameter is determined, the spatial frequency characteristic conversion section 104 filters the image data supplied from the resolution conversion section 103 based on the correction characteristic and outputs the result. The filtered image data is once stored in a buffer memory 108, then is supplied to the image data output section 105. Before the image data is output through the image data output section 105, it can also be edited. The image output section 105 supplies the image data to the image output unit specified by the image output selection signal SELL.

Operation:

The operation from input of integrated image data through a scanner to output of image data in the integrated image data via a printer will be discussed as an operation example of the embodiment.

First, the user sets a target transfer characteristic in the spatial frequency characteristic conversion section 104 through an input unit of the image processing apparatus 1. If the user does not set any target transfer characteristic, the default target transfer characteristic is set in the spatial frequency characteristic conversion section 104.

Next, based on the user setting, the image processing apparatus 1 sets the following in a scanner driver (scanner control program in the image processing apparatus 1):

(1) Scanner operation mode (high image quality mode or high speed mode);
(2) read resolution (24 dpm, 16 dpm, etc.,); and
(3) read range.

The scanner driver reads the resolution information and spatial frequency characteristic corresponding to the setup state from among the previously stored resolution information and spatial frequency characteristics and supplies them to the input processing section 101 as resolution and spatial frequency characteristic description divisions. Through the data analysis section 102, the resolution information is stored in the resolution conversion section 103 and the spatial frequency characteristic is stored in the spatial frequency characteristic conversion section 104.

Next, when the user selects any desired printer from among the image output units 4, the output device selection section 106 outputs an image output selection signal SELL indicating the printer, whereby the output device information storage section 107 outputs the resolution information of the printer to the resolution conversion section 103 and the spatial frequency characteristic of the printer to the spatial frequency characteristic conversion section 104.

Then, the resolution conversion section 103 calculates a data scaling factor applied if the output image scaling factor is set to 100%. The calculated data scaling factor is stored in the resolution conversion section 103 and is also supplied to the spatial frequency characteristic conversion section 104. The spatial frequency characteristic conversion section 104 calculates a scaled spatial frequency characteristic, correction characteristic, etc., based on the supplied data scaling factor and the spatial frequency characteristics of the input image data and printer.

The user can specify any desired output image scaling factor for the resolution conversion section 103. When a new output image scaling factor is specified, a new data scaling factor is calculated based on Equation (1) accordingly. Accompanying this calculation, the scaled spatial frequency characteristic, correction characteristic, and the like in the spatial frequency characteristic conversion section 104 are again calculated.

Next, when the read operation of the scanner is started in response to a user-entered command, the contents of an original document placed on platen glass of the scanner are read under the control of the scanner driver. The read contents are supplied via the input processing section 101 and the data analysis section 102 to the resolution conversion section 103, which then converts the supplied contents into image data of the resolution responsive to the printer.

The spatial frequency characteristic conversion section 104 filters the resultant image data based on the correction characteristic and stores the filtering result in the buffer memory 108. The contents of the buffer memory 108 are read in response to the image output speed of the printer and an image is output through the printer.

Second Embodiment

Figure 2:
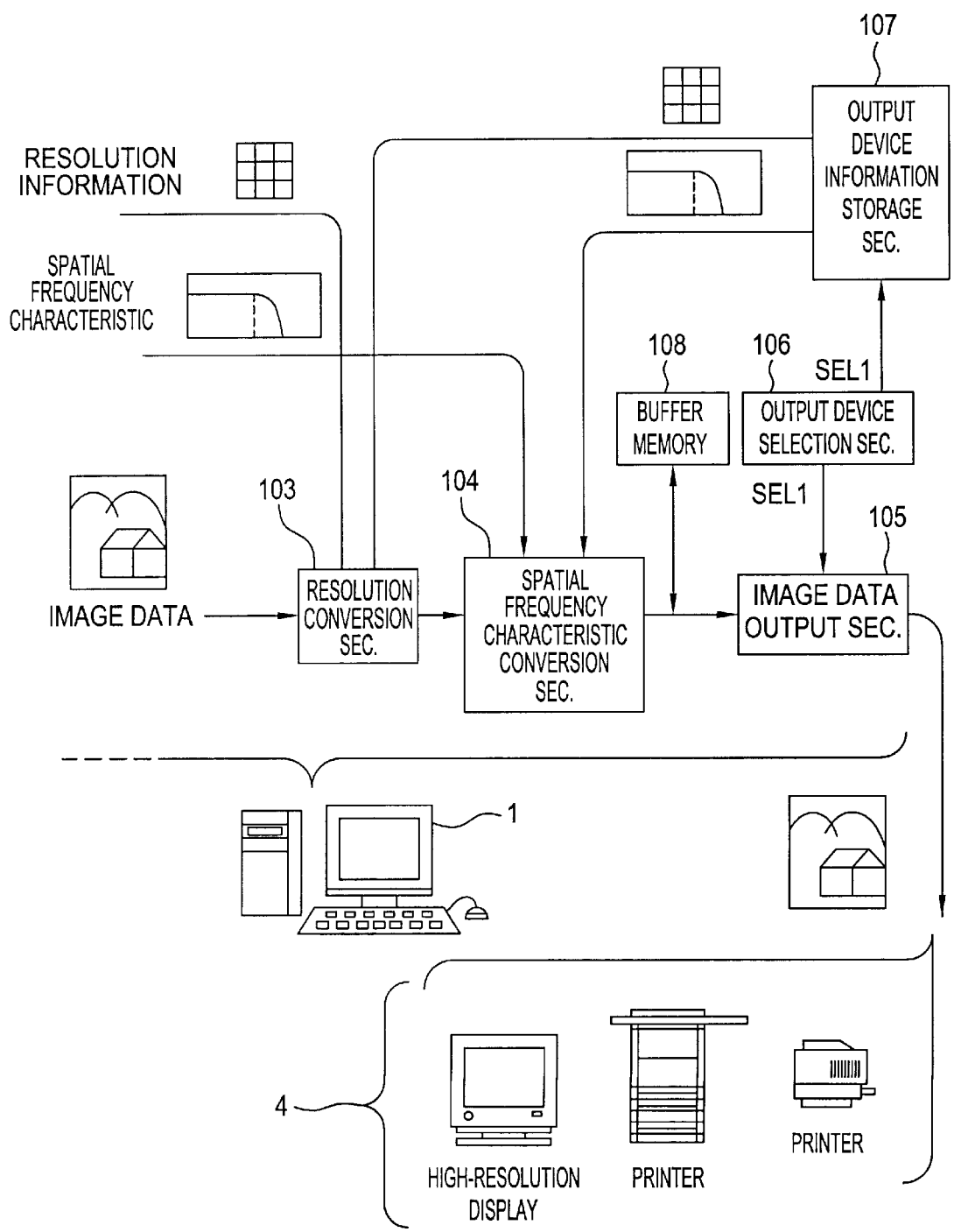
Figure 5:
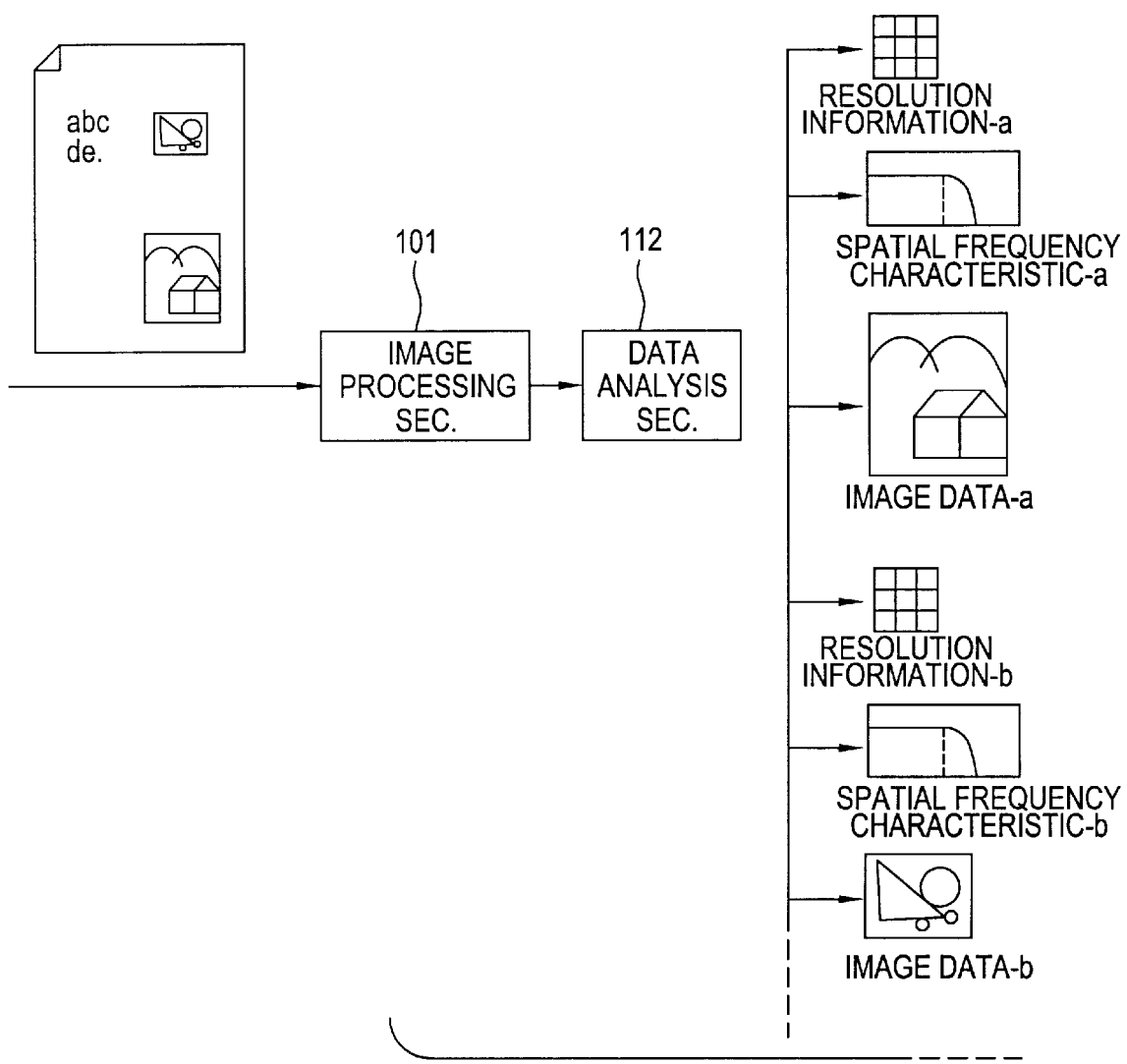
Figure 6:
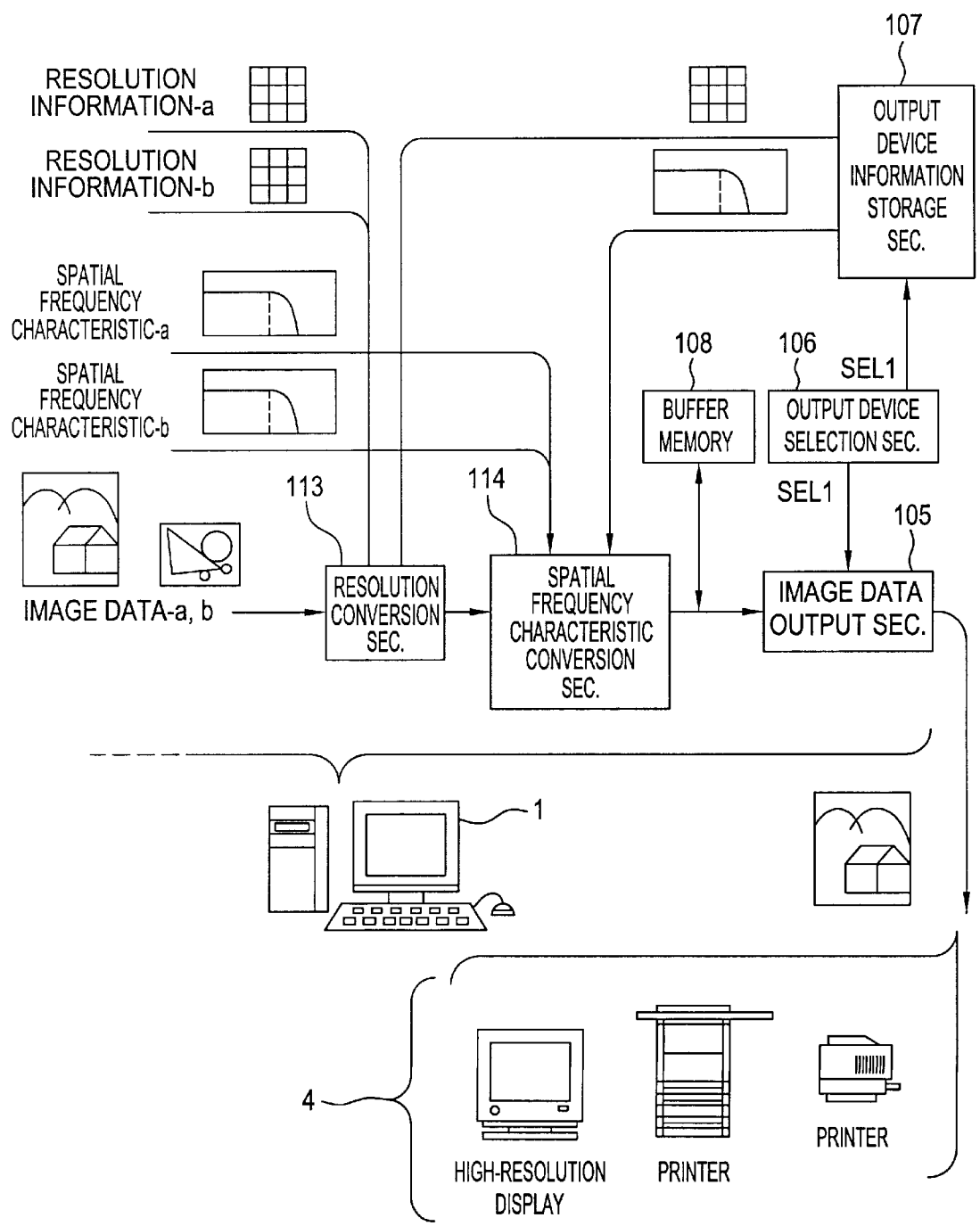

Configuration:

Next, the configuration of a second embodiment of the invention will be discussed with reference to FIGS. 4–6. Parts identical with or similar to those previously described with reference to FIGS. 1–2 are denoted by the same reference numerals in FIGS. 4–6 and will not be discussed again.

Figure 4:
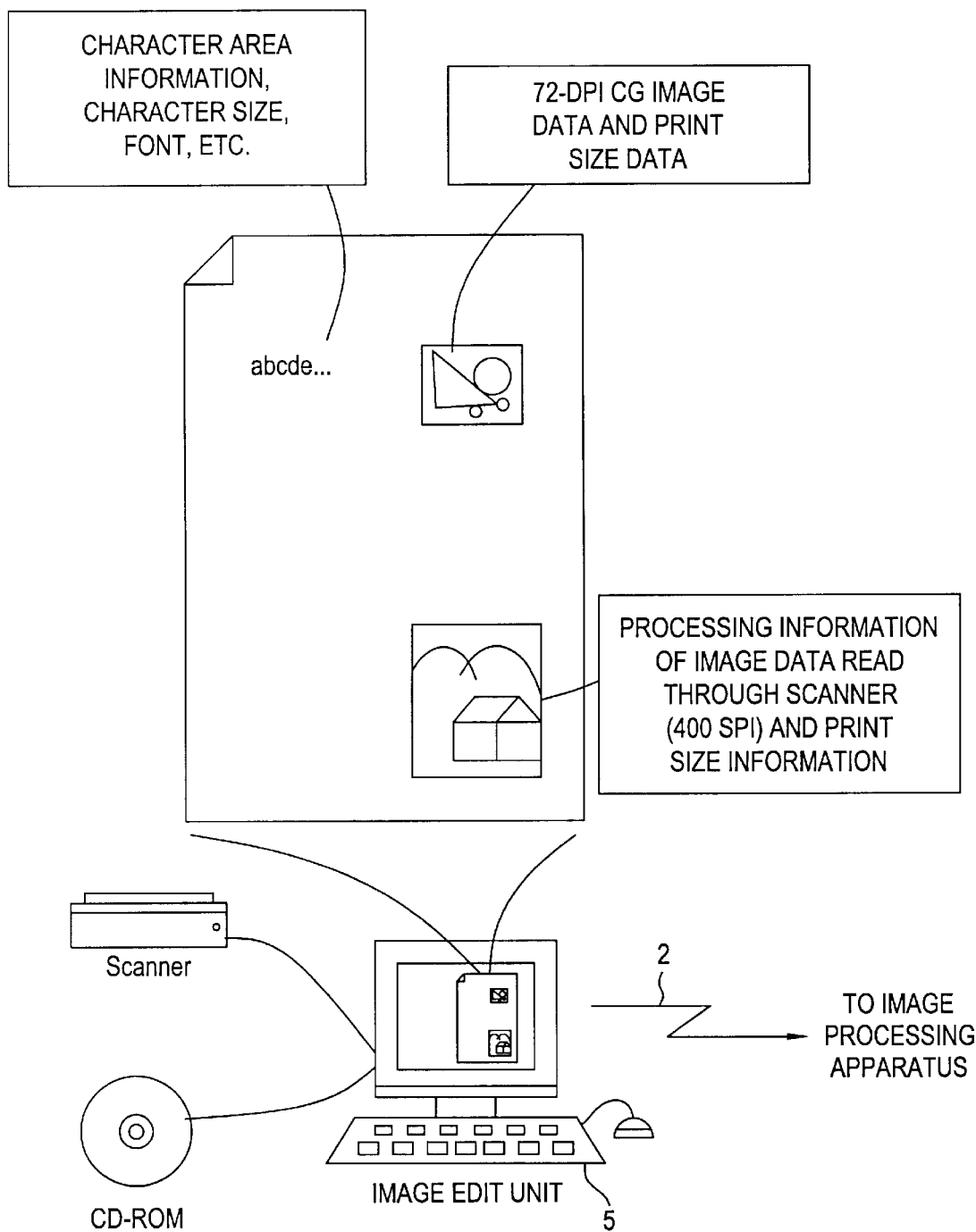
FIGS. 4–6 are block diagrams showing the configuration of an image processing system according to a second embodiment of the invention.

In FIG. 4, numeral 5 is an image edit unit comprising a scanner, a CD-ROM driver, etc., for editing image data by application software installed in the image edit unit 5.

That is, text information, 400-spi image data read through the scanner, and 72-spi computer graphics image data read from CD-ROM are mixed in document data. Thus, document data contains different types of image elements (objects). For each object, resolution information, spatial frequency characteristic in preparation process, which will be hereinafter referred to as input spatial frequency characteristic, and the like are stored in the image edit unit 5.

When the user operates the image edit unit 5 as predetermined, the corresponding document data is output via a network. At the time, the resolution information and input spatial frequency characteristic for each object are contained in the document data. Next, in FIG. 5, the document data via the network 2 is supplied via an input processing section 101 to a data analysis section 112.

The data analysis section 112 divides the document data into objects. Further, like the data analysis section 102 in the first embodiment, the data analysis section 112 analyzes each object and divides it into a resolution description division, a spatial frequency characteristic description division, and a gradation map data description division. Numeral 113 is a resolution conversion section. Upon reception of resolution information and output image scaling factors of objects and an image output unit, the resolution conversion section 113 calculates a data scaling factor for each object on the same principle as the first embodiment.

Numeral 114 is a spatial frequency characteristic conversion section for previously storing a target transfer characteristic like the conversion section 104 in the first embodiment. Upon reception of the data scaling factor for each object from the resolution conversion section 113 and the spatial frequency characteristic for each object from the data analysis section 112, the spatial frequency characteristic conversion section 114 scales the spatial frequency characteristics and once stores the results (scaled spatial frequency characteristics).

As in the first embodiment, an output device information storage section 107 supplies the spatial frequency characteristic of the image output unit to the spatial frequency characteristic conversion section 114 based on an image output selection signal SEL1, whereby the spatial frequency characteristic conversion section 114 calculates a correction characteristic for each object. Also, the spatial frequency characteristic conversion section 114 counts pixel clocks (clocks in horizontal and vertical scanning directions) and always recognizes the object to which the coordinates specified by counting the pixel clocks belong. A transfer function of the spatial frequency characteristic conversion section 114 is set so as to equal the correction characteristic of the recognized object.

Operation:

The operation from input of document data to an image processing apparatus 1 by the image edit unit 5 to output of the document data contents via a printer will be discussed as an operation example of the embodiment.

First, the user sets a target transfer characteristic in the spatial frequency characteristic conversion section 114 through an input unit of the image processing apparatus 1. If the user does not set any target transfer characteristic, the default target transfer characteristic is set in the spatial frequency characteristic conversion section 114, as in the first embodiment.

Next, based on the user setting, document data is prepared in the image edit unit 5. As described above, 400-spi image data, 72-spi computer graphics image data read from CD-ROM, etc., can be selected as objects used as materials of the document data.

The objects are input to the image edit unit 5 together with the resolution information and input spatial frequency characteristics of the objects. They are placed on a document based on a user command; they are scaled appropriately to arrange the format of the document.

When the objects are thus scaled in the image edit unit 5, the resolution information and input spatial frequency characteristics of the objects are scaled as with the resolution conversion section 103 and the spatial frequency characteristic conversion section 104 in the first embodiment.

Next, when the user operates the image edit unit 5 as predetermined, data contained in the first page of the document data is output via the network 2. At the time, the resolution information and input spatial frequency characteristics for each object are contained in the document data. If the object is scaled, its corresponding resolution information and input spatial frequency characteristic are changed in response to the scaling factor.

The document data supplied to the image processing apparatus 1 is divided into objects through the input processing section 101 and the data analysis section 112. Further, each object is divided into a resolution description division, a spatial frequency characteristic description division, and a gradation map data description division. Next, the resolution conversion section 113 calculates a data scaling factor for each object.

The spatial frequency characteristic conversion section 114 calculates a scaled spatial frequency characteristic for each object. When the image data concerning each object is supplied via the resolution conversion section 113 to the spatial frequency characteristic conversion section 114, the image data is filtered based on the scaled spatial frequency characteristic corresponding to the object related to the image data and the filtering result is stored in a buffer memory 108.

Thus, when the resolution conversion and filtering results for the objects are stored in the buffer memory 108 in sequence and the output image data concerning the first page is complete, the output image data is output through an image output section 105 to the previously selected image output unit (printer). After this, similar processing is also repeated for the second and later pages of the document data.

Third Embodiment

Figure 7:
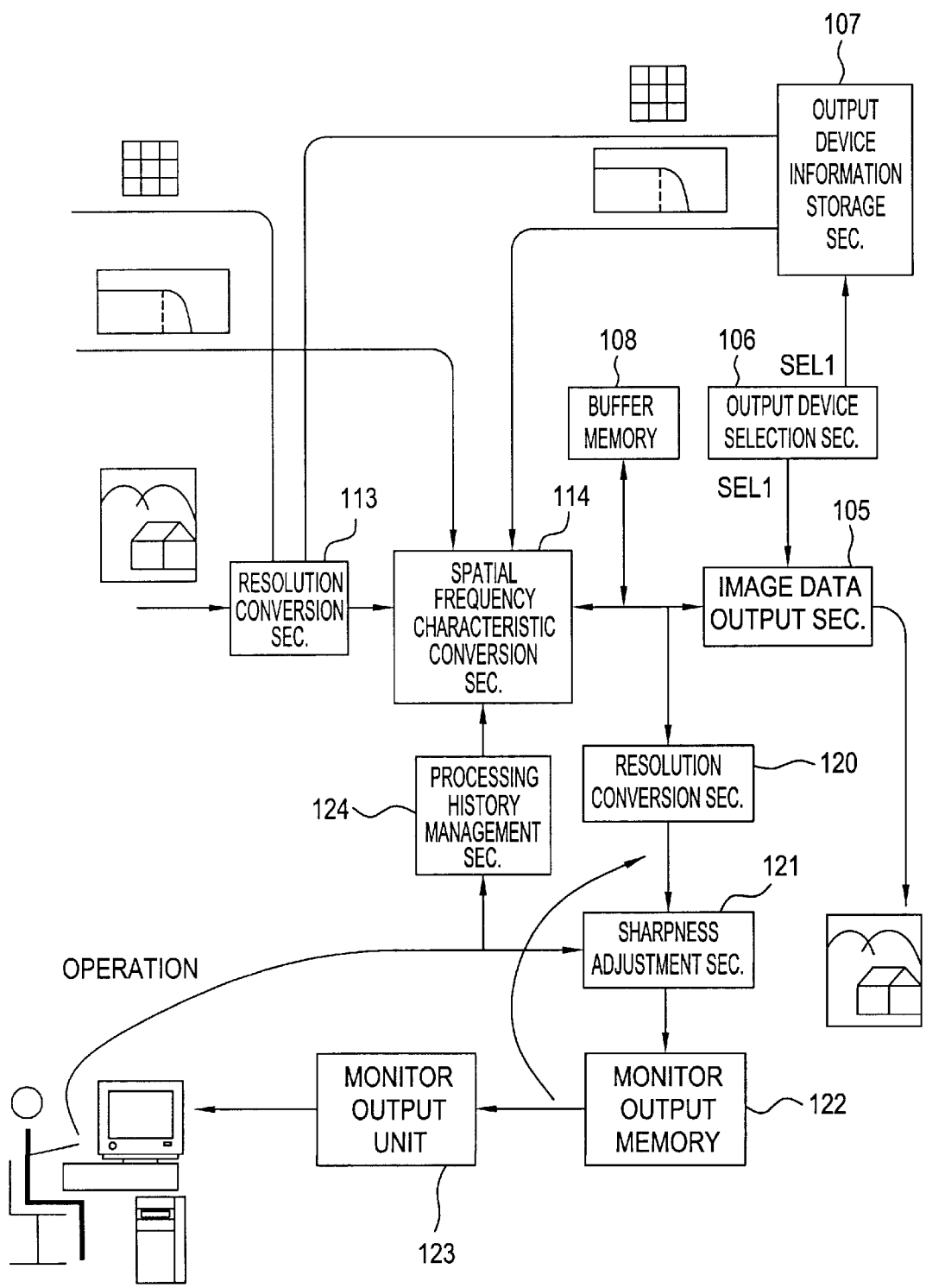
FIG. 7 is a block diagram showing the configuration of the main portion of an image processing system according to a third embodiment of the invention.

Configuration:

Next, the configuration of a third embodiment of the invention will be discussed with reference to FIG. 7. Parts identical with or similar to those previously described with reference to FIGS. 1–2 and 4–6 are denoted by the same reference numerals in FIG. 7 and will not be discussed again. FIG. 7 shows the configuration of the second half of the third embodiment (resolution conversion section 113 and its following sections); the configuration of the first half of the third embodiment is the same as that of the second embodiment (FIGS. 4 and 5).

In FIG. 7, numeral 123 is a monitor output unit for displaying the result of a sharpness adjustment made by the user to image data stored in a buffer memory 108. Numeral 120 is a resolution conversion section for converting the resolution of image data for image output units 4 (for example, 400 dpi) into a resolution for display on the monitor output unit (for example, 72 dpi).

Numeral 121 is a sharpness adjustment section for making a sharpness adjustment of image data output from the resolution conversion section 120 (adjustment of spatial frequency characteristic) in response to the user operation and writing the adjustment result into a monitor output memory 122. Resultantly, the image data written into the monitor output memory 122 is displayed on the monitor output unit 123. Numeral 124 is a processing history management section for storing a history of sharpness adjustments specified by the user.

Operation:

The operation of the embodiment will be discussed. First, as in the second embodiment, objects of document data are supplied to a resolution conversion section 113, which then executes resolution conversion and supplies the result to a spatial frequency characteristic conversion section 114. The spatial frequency characteristic conversion section 114 filters the data, then writes the filtering result into the buffer memory 108.

In the third embodiment, however, the target transfer characteristic (function F4 in FIG. 3) is made flat at the first stage. Resultantly, the transfer function of the spatial frequency characteristic conversion section 114 (function F5 in FIG. 3) becomes drastically different as compared with the characteristic shown in the figure. Next, a default transfer function is set in the sharpness adjustment section 121. It equals the function F4 shown in FIG. 3. The sampling value of the function F4 is recorded in the processing history management section 124.

Next, the resolution conversion section 120 converts the resolution of the image data stored in the buffer memory 108. The resultant image data is supplied to the sharpness adjustment section 121, which then filters the data based on the preset transfer function (the default value is the function F4) and writes the filtering result into the monitor output memory 122. Then, the resultant image data is displayed through the monitor output unit 123.

Figure 3:
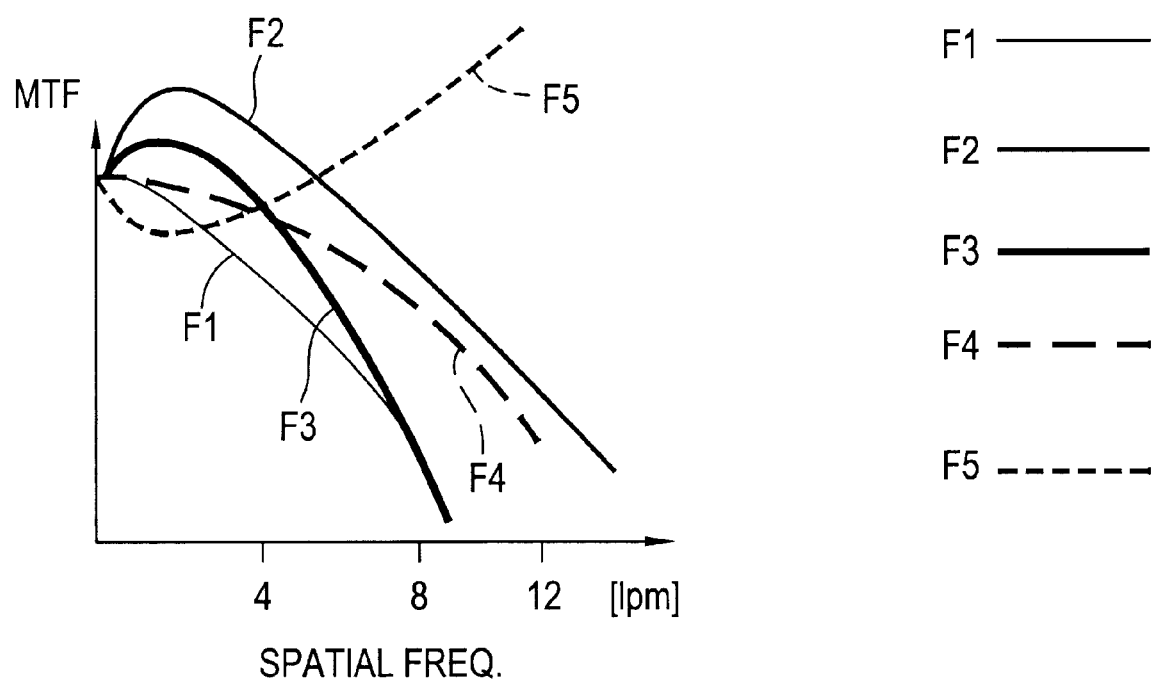
FIG. 3 is a graph showing the operation of a spatial frequency characteristic conversion section in the first embodiment of the invention.

As described above, the transfer function F5 in the spatial frequency characteristic conversion section 114 is set with the function 4 made flat. However, after the resolution conversion is executed, filtering is performed based on the former function F4 (as shown in FIG. 3) through the sharpness adjustment section 121. After all, the image displayed on the monitor output unit 123 becomes similar to the filtering result based on the function F5 shown in FIG. 3.

Next, while seeing the image displayed on the monitor output unit 123, the user sets the transfer function in the sharpness adjustment section 121 so as to make the image more appropriate. When the transfer function is changed, it is stored in the processing history management section 124. The image data undergoing the resolution conversion is again filtered based on the newly setup transfer function and the filtering result is written into the monitor output memory 122 and is displayed on the monitor output unit 123.

When the image is displayed in the optimum state and the user performs predetermined operation, the last transfer function recorded in the processing history management section 124 (function F4') is transferred to the spatial frequency characteristic conversion section 114. The current transfer function of the spatial frequency characteristic conversion section 114 is set to the function F4'. Next, the image data stored in the buffer memory 108 is restored to the spatial frequency characteristic conversion section 114 and is filtered based on the function F4'. This filtering result is once stored in the buffer memory 108, then is output via the image data output section 105 and an image output unit, such as a printer.

As we have discussed, in the embodiment, the image data output from the resolution conversion section 120 is filtered. Here, a question may occur that "the sharpness adjustment section 121 may be removed and the spatial frequency characteristic conversion section 114 may perform all filtering processing." This point will also be discussed below.

Generally, the resolution of a printer, etc., (about 400 dpi) is higher than the resolution of a display (about 72 dpi). Thus, the amount of the image data stored in the buffer memory 108 becomes enormous as compared with that after resolution conversion. Since filtering involves numerical computations, the processing time prolongs almost in proportion to the data amount.

Of course, such processing needs to be performed whenever final image data is output to a printer, etc. However, it would be sufficient at the stage setting the function F4' by trial and error to perform processing only for a small amount of image data undergoing resolution conversion and reflect only the final result in the final filtering characteristic of the spatial frequency characteristic conversion section 114. In view of the circumstances, in the embodiment, the sharpness adjustment section 121 filters the data at an intermediate stage.

According to the embodiment, the user can determine the function F4' while seeing the monitor output unit 123, so that the optimum transfer function can be easily assigned to the spatial frequency characteristic conversion section 114. Moreover, since the sharpness adjustment section 121 filters the data until the final transfer function of the spatial frequency characteristic conversion section 114 is determined, the intermediate setting result of the function F4' can be evaluated promptly and the optimum function F4 can be determined efficiently.

Figure 10:
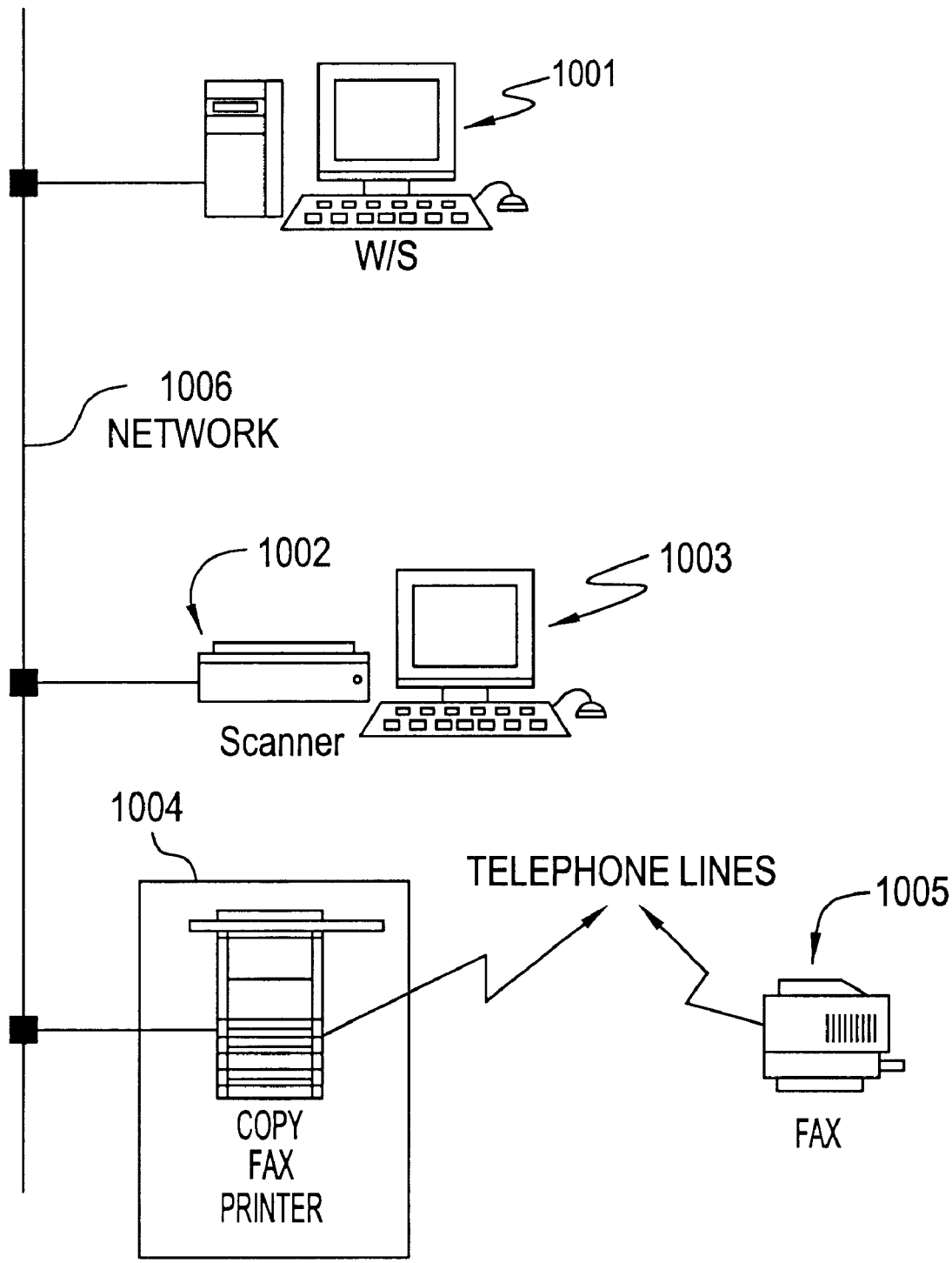
FIG. 10 is a block diagram showing the configuration of an image processing system according to a fourth embodiment of the invention.

Fourth Embodiment
Configuration:

Next, the configuration of a fourth embodiment of the invention will be discussed with reference to FIG. 10. Parts identical with or similar to those previously described with reference to FIGS. 1–9 are denoted by the same reference numerals in FIG. 10 and will not be discussed again. In FIG. 10, numeral 1001 is a workstation, numeral 1002 is an image scanner, and numeral 1003 is a workstation for controlling the image scanner 1002. They are connected to a network 1006.

Numeral 1004 is a composite machine having copier, facsimile, and printer functions. That is, the composite machine 1004 can copy an original document set on an original document placement bed like normal copiers, print out data described in a page description language, etc., supplied via the network 1006, and communicate with other facsimile machines over a telephone line.

Figure 11:
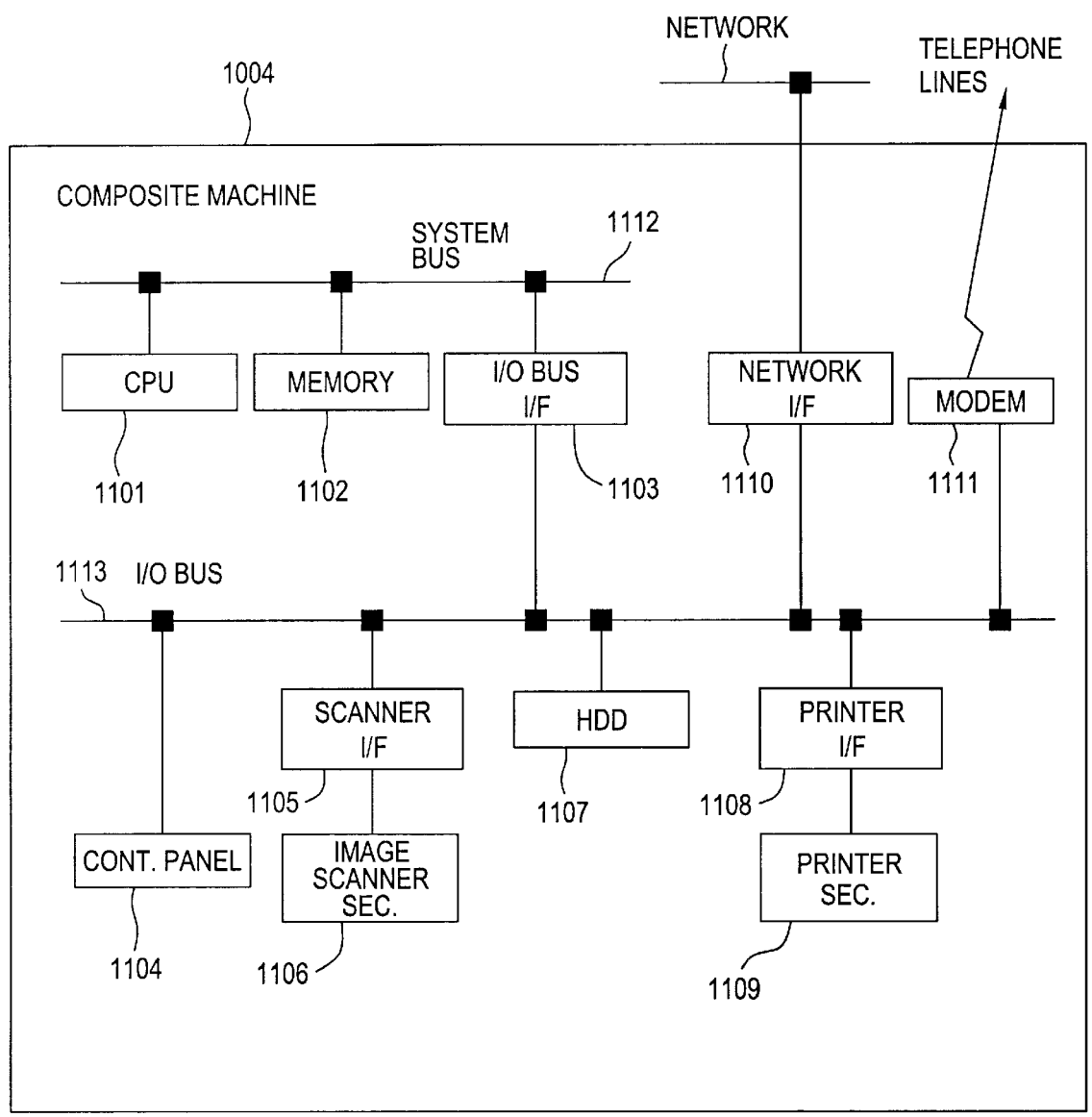
FIG. 11 is a block diagram of a composite machine in the fourth embodiment of the invention.

Next, the detailed configuration of the composite machine 1004 will be discussed with reference to FIG. 11. In the figure, numeral 1101 is a central processing unit which is connected to a memory 1102 and an I/O bus interface 1103 via a system bus 112. Numeral 1104 is a control panel for accepting user-entered commands and outputting accepted commands via an I/O bus 1113.

Numeral 1106 is an image scanner section for reading the contents of an original document set on the original document placement bed. Numeral 1105 is a scanner interface for outputting image data of the read result of the image scanner section 1106 via the I/O bus 1113. Numeral 1107 is a hard disk drive for buffering image data supplied via the I/O bus 1113 and outputting the buffered data via the I/O bus 1113 as required.

Numeral 1108 is a printer interface for controlling a printer section 1109 and outputting image data supplied via the I/O bus 1113. Numeral 1110 is a network interface for transferring data between the I/O bus 1113 and the network 1006. Numeral 1111 is a modem for transferring facsimile data over the telephone line.

Operation:

(1) Outline of operation

The composite machine 1004 of the embodiment having the configuration described above serves as a copier, a printer, or a facsimile machine like known composite machines. For example, when the user edits a document with a text editor, etc., at the workstation 1001, the prepared text data is supplied to the composite machine 1004 via the network 1006 and is printed out.

Image data read through the image scanner 1002, text data prepared with a text editor, image data prepared by a graphics tool, or the like may be edited by page layout software at the workstation 1003. In such a case, the edited data is converted into a page description language, then the resultant data is supplied to the composite machine 1004 and is printed out therethrough.

Further, read image data of an original document set on the original document placement bed or image data described in a page description language, etc., supplied via the network 1006 is supplied to a different facsimile machine 1005. In contrast, image data supplied from the facsimile machine 1005 is printed out. The original document set on the original document placement bed may be simply copied, needless to say.

(2) Input channels and output sections of composite machine 1004

Focusing attention on what components are adopted as input channels and output sections in the operation of the composite machine 1004, the following three input channels and the following three output sections exist:

<First input channel>

The first input channel is the image scanner section 1106. That is, read image data from the image scanner section 1106 is supplied through the scanner interface section 1105 to the central processing unit 1101 and the memory 1102 for processing the image data after the scanning.

<Second input channel>

The second input channel is the telephone line. That is, a fax signal sent over the telephone line is supplied through the modem 1111 to the central processing unit 1101 and the memory 1102 for decoding the fax signal.

<Third input channel>

The third input channel is the network 1006. That is, PDL data sent through the network 1006 is supplied through the network interface 1110 to the central processing unit 1101 and the memory 1102 for rasterizing the PDL data.

If any one of the input channels is adopted, upon completion of processing of the input channel, input data is once stored on the hard disk drive 1107. Next, the input data stored on the hard disk drive 1107 is subjected to resolution conversion processing and spatial frequency characteristic conversion processing (described later in detail), then the resultant data is sent to any of the following three output sections:

<First output section>

The first output section is the printer section 1109. That is, printer output image processing is performed by the central processing unit 1101 and the memory 1102 and the result is transmitted through the printer interface 1108 to the printer section 1109, which then prints out an image.

<Second output section>

The second output section is the telephone line. That is, a fax signal is encoded by the central processing unit 1101 and the memory 1102 and the encoded fax signal is output through the modem 1111 to the telephone line.

<Third output section>

The third output section is the network 1006. That is, desired format conversion processing, etc., is performed for image data by the central processing unit 1101 and the memory 1102 and the resultant image data is output through the network interface 1110 to the network 1106.

(3) Functions of composite machine 1004

Figure 12:
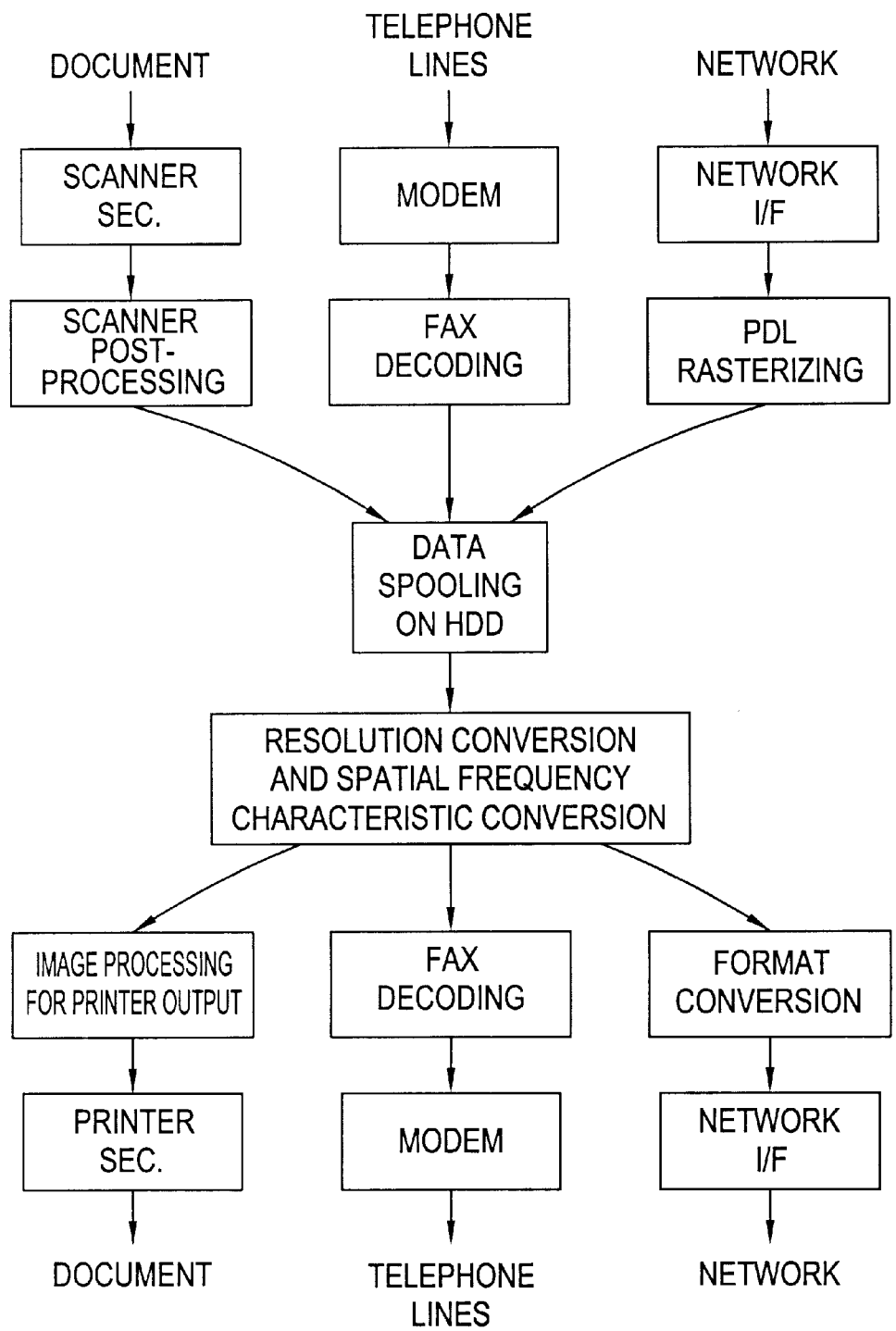
FIG. 12 shows an operation flow of the composite machine of FIG. 11.

FIG. 12 shows an operation flow of the three input channels and the three output sections. The function of the composite machine 1004 is determined by which of the input channels and output sections are adopted. Therefore, nine functions of the composite machine 1004 are possible in total in principle.

However, the function provided by adopting the telephone line or the network 1006 for both input and output is not general as the function of the composite machine. Therefore, the embodiment assumes that the seven functions of the composite machine 1004 shown in FIG. 13 are set.

(4) Specific operation of image processing

Image processing performed by the central processing unit 1101 and the memory 1102 of the composite machine will be discussed. Dedicated hardware may be used for such processing, needless to say.

For example, assume that the scanner section and printer section have the following specifications:

Scanner section: basic resolution=24 DPM

Read mode: high speed mode or high image quality mode

Printer section: basic resolution=24 DPM

Output mode: character, graphics mode or picture mode (4)-(i) Image input processing As described above, image data is input through the three input channels. The input data is processed in response to the input channel and spooled on the HDD 1107. At this time, the data spooled on the HDD 1107 is integrated image data made up of a spatial frequency characteristic description division in data preparation process, a data resolution description division, bit map image data, and a tag plane. The input processing for each image input will be discussed:

(4)-(i-i) Image input from scanner section

Read image data from the image scanner section 1106 is processed according to a flow shown in FIG. 14 as scanner postprocessing. Scanner characteristic information required at steps 1401 and 1402 is information prestored as input characteristic information on the HDD 1107.

First, a data resolution is calculated at step 1401. The data resolution Rd is calculated from scanner basic resolution Rs and scaling specification information; it is found by Rd=Rs/m where m is the specified scaling factor.

Next, a spatial frequency characteristic in data preparation process is calculated at step 1402. The spatial frequency characteristic data of the scanner corresponding to the read mode (high speed mode or high image quality mode) is read from the memory.

The read spatial frequency characteristic data of the scanner describes the spatial frequency transfer characteristics at a Nyquist frequency Ns determined by the scanner basic resolution Rs and at frequencies of Ns/2, Ns/3, Ns/4, and Ns/5, which themselves become the spatial frequency transfer characteristics in data preparation process at a Nyquist frequency Nd determined from the data resolution Rd and at frequencies of Nd/2, Nd/3, Nd/4, and Nd/5.

Next, a tag plane is generated at step 1403. The tag plane is bit map data of the same size as read image data. Whether or not each minute area of read data is a character, graphics area or a picture area is determined, and if it is the character, graphics area, the determination result "0" is prepared as the tag plane; if it is the picture area, the determination result "1" is prepared.

Lastly, integrated image data is generated at step 1404. It consists of one set of the data resolution, spatial frequency characteristic in data preparation process, read image data, and tag plane; the data resolution and spatial frequency characteristic in data preparation process are described in the format corresponding to the tag "0" or "1" classified by the tag plane.

(4)-(i-ii) Fax signal input from modem

When a fax signal is supplied from the modem 1111, processing is performed according to a flow shown in FIG. 15. First, resolution information of reception signal is recognized based on the fax specifications at step 1501. Next, the fax signal is decoded and bit map image data of the resolution is prepared at step 1502. Finally, integrated image data is generated at step 1503. Here, "0" is described in the spatial frequency transfer characteristic description division in data preparation process and the tag plane.

(4)-(i-iii) PDL data input from network interface 1110

When PDL data is input from the network interface 1110, processing is performed according to a flow shown in FIG. 16. The PDL data consists of objects, each of which is represented by code information, vector information, or image data. As attendant information, the data resolution Rd and the spatial frequency transfer characteristics in object preparation process at a Nyquist frequency Nd and frequencies of Nd/2, Nd/3, Nd/4, and Nd/5 are described for the objects represented by image data.

Each object of code information or vector information is expanded to 24-DPM bit map image data of the printer basic resolution at step 1601. At the same time, tag "0" indicating a character, graphics area is described at the corresponding pixel position of the tag plane at step 1602.

For the bit map image data generated from code information or vector information, NULL is described as the spatial frequency transfer characteristic corresponding to tag "0" at step 1603 because the spatial frequency transfer characteristic in image data preparation process is 1.

On the other hand, each object represented by image data is subjected to resolution conversion to 24-DPM bit map image data of the printer basic resolution at step 1601. At the same time, different tags are described for each object at the corresponding pixel positions of the tag plane at step 1602.

At step 1603, the spatial frequency transfer characteristic in image data preparation process is calculated for each object and the result is described as the spatial frequency transfer characteristic corresponding to each tag number. Here, the spatial frequency transfer characteristic in image data preparation process is calculated based on the spatial frequency transfer characteristic in object preparation process described for each object in the PDL.

The spatial frequency transfer characteristics in object preparation process are the spatial frequency transfer characteristics in data preparation process at the Nyquist frequency Nd determined from the data resolution Rd and the frequencies of Nd/2, Nd/3, Nd/4, and Nd/5, as described above.

For image data, resolution conversion is executed for 24-DPM bit map image data of the printer basic resolution at step 1601. Thus, assuming that the Nyquist frequency determined from the data resolution Re after the resolution conversion is Ne and that the resolution conversion rate h=Re/Rd, the frequency transfer characteristic at spatial frequency Nd before the resolution conversion represents the frequency transfer characteristic at spatial frequency Ne/h after the resolution conversion.

Based on the correspondence, the spatial frequency transfer characteristics in data preparation process at the frequencies Ne, Ne/2, Ne/3, Ne/4, and Ne/5 are calculated. Last, integrated image data is generated at step 1604. It consists of one set of the data resolution, spatial frequency characteristic in data preparation process, read image data, and tag plane; the data resolution and spatial frequency characteristic in data preparation process are described in the format corresponding to the tag classified by the tag plane. Every data resolution becomes the printer basic resolution, 24 DPM.

(4)-(ii) Image output common processing

As described above, image data is output from any of the three channels. Integrated image data made up of a spatial frequency characteristic description division in data preparation process, a data resolution description division, bit map image data, and a tag plane, spooled on the HDD 1107 is subjected to resolution conversion processing and spatial frequency conversion processing, then undergoes separate processing in response to the output channel and the resultant data is output.

First, information shown in FIG. 17 is stored in an output device information storage section of the HDD 1107. When the output destination is determined, its corresponding resolution information and spatial frequency information are referenced. If a printer is specified as the output destination, two pieces of information are referenced as output device characteristics because the printer output mode is the character, graphics mode or the picture mode and the spatial frequency characteristic is F6 or F7 depending on the mode.

Resolution conversion processing and spatial frequency conversion processing are performed for the bit map image data, as in the resolution conversion section 103 and the spatial frequency characteristic conversion section 104 in the first embodiment. Here, as the resolution information of the input data and the spatial frequency characteristic information in data preparation process, the tag plane is referenced and the resolution information and spatial frequency characteristic information in data preparation process corresponding to the tag are used.

If a printer is specified as the output destination, the tag plane is referenced and the resolution information and spatial frequency characteristic information in data preparation process corresponding to the tag are used as the output device characteristics. However, if the referenced resolution information is NULL, it indicates that resolution conversion is not required and if the spatial frequency characteristic information is NULL, it indicates that the spatial frequency transfer characteristic is 1.

If a printer is specified as the output destination of the image data subjected to the common output processing, printer output postprocessing is performed for the image data, then the resultant image data is transferred via the printer interface 1108 to the printer section for printing out the data.

If the modem is specified as the output destination, a fax signal is encoded, then is sent via the modem to the telephone line. If the network interface is specified as the output destination, format conversion processing is performed as required, then the data is sent via the network interface 1110 to the network 1006.

Modifications

The invention is not limited to the above-described embodiments and, for example, the following modifications are possible.

(1) In the first embodiment, the scanner driver reads the resolution information and spatial frequency characteristic corresponding to the setup state from among the prestored resolution information and spatial frequency characteristics, and supplies the read contents to the input processing section 101 as the resolution description division and the spatial frequency characteristic description division. However, the resolution information and spatial frequency characteristic can also be supplied to the input processing section 101 by a different method.

For example, if the CD-ROM drive or the like is selected as the image input unit 3, the resolution information and spatial frequency characteristic may be stored on a CD and the storage contents may be supplied via the network 2 to the input processing section 101. Likewise, if the scanner is selected as the image input unit 3, the scanner itself may also output the resolution information, etc.

It is also possible that the scanner driver does not match the scheme of the embodiment (it does not supply the resolution information, etc., to the input processing section 101). In such a case, the resolution information, etc., is stored in a separate file (profile) and this profile is selected, whereby the resolution information and spatial frequency characteristic may be supplied to the resolution conversion section 103, the spatial frequency characteristic conversion section 104, etc.

Here, the profile may be selected uniquely based on specification of any of the image input units 3 (for example, specification of a specific scanner) or may be selected manually by the user.

If a CD does not match the scheme of the embodiment, it is difficult to completely grasp input spatial frequency characteristics. However, if a proper scheme (for example, a compression scheme) is adopted for each producer and proper input spatial frequency characteristics are recognized for each producer, input spatial frequency characteristics can also be estimated to some extent according to the adopted scheme. In such a case, input spatial frequency characteristics may be estimated based on compression parameters, etc.

(2) If the CD-ROM drive or the like is selected as the image input unit 3, the image data itself stored on a CD, etc., can also be considered original image data. In such a case, input spatial frequency characteristic can be considered flat and therefore processing may be performed without supplying spatial frequency characteristic, etc., to the input processing section 101.

(3) The embodiments adopt raster data (an image read through the scanner in the first embodiment) and multimedia (document data prepared by the image edit unit 5 in the second and third embodiments) as image data. However, the image data to be processed is not limited to them and may be vector data, code data, etc.

(4) In the third embodiment, to correct a printer of an image output unit, the monitor output unit 123 is used to adjust function F4'. However, another printer, etc., may be used in place of the monitor output unit 123. For example, when a high-quality printer is connected as the image output unit, conditions such that "cost required for image output per sheet of paper is high," that "wait time to image output is long," or that "the printer is located at a place considerably distant from the image processing apparatus 1" may occur.

In such a case, preferably an inexpensive printer is previously used to check an output image outline.

As we have discussed above, according to the invention, the spatial frequency characteristic in a preparation process of image data is recognized by the first recognition means and the spatial frequency reproduction characteristic in an output mode is recognized by the second recognition means. The spatial frequency characteristic of image data is converted based on the recognition results of the first and second recognition means. Thus, an appropriate correction characteristic can be easily set in response to the preparation process and output mode of each image data.

What is claimed is:

1. An image processing apparatus comprising:

first recognizing means for recognizing a spatial frequency characteristic in a process of preparing image data;

second recognizing means for recognizing a spatial frequency reproduction characteristic in an output mode for forming an image based on the image data; and means for converting a spatial frequency characteristic of the image data based on recognition results of the first and second recognizing means.

2. The image processing apparatus as claimed in claim 1, wherein the first recognizing means further recognizes resolution information in the process of preparing the image data.

3. The image processing apparatus as claimed in claim 1, wherein the spatial frequency reproduction characteristic in the output mode includes resolution information in the output mode.

4. The image processing apparatus as claimed in claim 1, further comprising third recognizing means for recognizing a spatial frequency reproduction characteristic for image adjustment, wherein the conversion means converts the spatial frequency characteristic of the image data further based on the recognition result of the third recognizing means.

5. The image processing apparatus as claimed in claim 1, wherein the first recognizing means recognizes the spatial frequency characteristic based on information added to the image data.

6. The image processing apparatus as claimed in claim 5, wherein the image data is constituted of objects, and wherein the first recognizing means recognizes the spatial frequency characteristic on an object-by-object basis.

7. The image processing apparatus as claimed in claim 1, further comprising means for storing device information relating the process of preparing image data, wherein the first recognizing means recognizes the spatial frequency characteristic based on the device information stored in the storing means.

8. The image processing apparatus as claimed in claim 1, further comprising means for storing output device information of the output mode, wherein the second recognizing means recognizes the spatial frequency reproduction characteristic based on the output device information stored in the storing means.

9. The image processing apparatus as claimed in claim 1, further comprising:

means for selecting one of two output modes for forming an image;

first correcting means for correcting image data that is output from the selected one of the two output modes; and second correcting means for correcting image data that is output from the other output mode based on a correction result of the first correcting means.

10. The image processing apparatus as claimed in claim 1, wherein the output mode is an output medium for producing the image.

11. The image processing apparatus as claimed in claim 1, wherein the output mode is an operation mo de of an output medium for producing the image.

12. An image processing method comprising the steps of:

a first recognizing step of recognizing a spatial frequency characteristic in a process of preparing image data;

a second recognizing step of recognizing a spatial frequency reproduction characteristic in an output mode for forming an image based on the image data; and converting a spatial frequency characteristic of the image data based on recognition results of the first and second recognizing steps.

13. The image processing method as claimed in claim 12, wherein the first recognizing step further recognizes resolution information in the process of preparing the image data.

14. The image processing method as claimed in claim 12, wherein the spatial frequency reproduction characteristic in the output mode includes resolution information in the output mode.

15. The image processing method as claimed in claim 12, further comprising a third recognizing step of recognizing a spatial frequency reproduction characteristic for image adjustment, wherein the converting step converts the spatial frequency characteristic of the image data further based on a recognition result of the third recognizing step.

16. The image processing method as claimed in claim 12, where in the first recognition step recognizes the spatial frequency characteristic based on information added to the image data.

17. The image processing method as claimed in claim 16, wherein the image data is constituted of objects, and wherein the first recognizing step recognizes the spatial frequency characteristic on an object-by-object basis.

18. The image processing method as claimed in claim 12, further comprising storing device information relating to the process of preparing the image data, wherein the first recognizing step recognizes the spatial frequency characteristic based on the stored device information.

19. The image processing method as claimed in claim 12, further comprising storing output device information of the output mode, wherein the second recognizing step recognizes the spatial frequency reproduction characteristic based on the stored output device information.

20. The image processing method as claimed in claim 12, further comprising the steps of:

selecting one of two output modes for forming an image;

a first correcting step of correcting image data that is output from the selected one of the two output modes; and a second correcting step of correcting image data that is output from the other output mode based on a correction result of the first correcting step.

21. The image processing method as claimed in claim 12, wherein the output mode is an output medium for producing the image.

22. The image processing method as claimed in claim 12, wherein the output mode is an operation mode of an output medium for producing the image.

* * * * *